(12) United States Patent
Pan et al.

(10) Patent No.: US 9,098,798 B2
(45) Date of Patent: Aug. 4, 2015

(54) METHODS AND APPARATUS FOR PREDICTION AND MODIFICATION OF BEHAVIOR IN NETWORKS

(75) Inventors: Wei Pan, Quincy, MA (US); Yaniv Altshuler, Ramat Ishai (IL); Alex Paul Pentland, Lexington, MA (US); Nadav Aharony, Sunnyvale, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 331 days.

(21) Appl. No.: 13/482,925

(22) Filed: May 29, 2012

(65) Prior Publication Data

US 2012/0303573 A1 Nov. 29, 2012

Related U.S. Application Data

(60) Provisional application No. 61/537,539, filed on Sep. 21, 2011, provisional application No. 61/490,512, filed on May 26, 2011.

(51) Int. Cl.
*G06N 7/02* (2006.01)
*G06N 7/00* (2006.01)
*G06Q 50/00* (2012.01)

(52) U.S. Cl.
CPC .............. *G06N 7/005* (2013.01); *G06Q 50/01* (2013.01)

(58) Field of Classification Search
None
See application file for complete search history.

(56) References Cited

U.S. PATENT DOCUMENTS

| 8,473,437 B2 * | 6/2013 | Zaman et al. ............... 706/21 |
| 2009/0018918 A1 * | 1/2009 | Moneypenny et al. ......... 705/14 |
| 2009/0099984 A1 | 4/2009 | Zhu et al. |
| 2009/0192809 A1 | 7/2009 | Chakraborty et al. |
| 2009/0282002 A1 | 11/2009 | Reeder et al. |
| 2010/0185630 A1 | 7/2010 | Cheng et al. |
| 2010/0198757 A1 | 8/2010 | Cheng et al. |
| 2011/0225291 A1 | 9/2011 | Dobroth et al. |

OTHER PUBLICATIONS

Chen, Wang, Yang, "Efficient Influence Maximization in Social Networks", Proceedings of KDD '09, the 15th ADM SIGKDD international conference on Knowledge discovery and data mining, 2009, pp. 199-208.*

Johan H. Koskinen, Garry L. Robins, Philippa E. Pattison, "Analysing exponential random graph (p-star) models with missing data using Bayesian data augmentation", Statistical Methodology vol. 7, 2010 pp. 366-384.*

(Continued)

*Primary Examiner* — Kakali Chaki
*Assistant Examiner* — Walter Hanchak
(74) *Attorney, Agent, or Firm* — Stephen R. Otis (57) ABSTRACT

In exemplary implementations of this invention, mobile application (app) installations by users of one or more networks are predicted. Using network data gathered by smartphones, multiple "candidate" graphs (including a call log graph) are calculated. The "candidate" graphs are weighted by an optimization vector and then summed to calculate a composite graph. The composite graph is used to predict the conditional probabilities that the respective users will install an app, depending in part on whether the user's neighbors have previously installed the app. Exogenous factors, such as the app's quality, may be taken into account by creating a virtual candidate graph. The conditional probabilities may be used to select a subset of the users. Signals may be sent to the subset of users, including to recommend an app. Also, the probability of successful "trend ignition" may be predicted from network data.

4 Claims, 7 Drawing Sheets

(56) References Cited

OTHER PUBLICATIONS

Anand Narasimhamurthy, P'adraig Cunningham, and Derek Greene, "Viewing the minimum dominating set and maximum coverage problems motivated by "word of mouth marketing" in a problem decomposition context", University College Dublin Technical Report UCD-CSI-2009-51, "http://www.csi.ucd.ie/files/GraphCoverage_TechReport05.pdf", 2009, pp. 1-19.*

Counts, S., Fisher, K.E., "Mobile Social Networking: An Information Grounds Perspective", Hawaii International Conference on System Sciences, Proceedings of the 41st Annual, Jan. 7-10, 2008, 1-10.*

Wortman, "Viral Marketing and the Diffusion of Trends on Social Networks", Technical Report MS-CIS-08-19, Department of Computer and Information Science, UPenn, May 15, 2008, pp. 1-25.*

Asur, Huberman, Szabo, Wang, "Trends in Social Media: Persistence and Decay", published online arXiv:1102.1402v1 [cs.CY] at "http://arxiv.org/abs/1102.1402" on Feb. 7, 2011, pp. 1-12.*

Nathan Eagle and Alex (Sandy) Pentland, "Reality mining: sensing complex social systems", Journal Personal and Ubiquitous Computing archive, vol. 10, Issue 4, May 2006, pp. 255-268.*

Ran El-Yaniv, Dmitry Pechyony, Elad Yom-Tov, "Better multiclass classification via a margin-optimized single binary problem", Pattern Recognition Letters, vol. 29, 2008, pp. 1954-1959.*

Alan E. Mislove, "Online Social Networks: Measurement, Analysis, and Applications to Distributed Information Systems" published by Rice University, Houston, TX for awarding phd thesis, 2009, pp. 1-244.*

Andrew Gelman, "A Bayesian Formulation of Exploratory Data Analysis and Goodness-of-fit Testing", International Statistical Review, vol. 71, No. 2, 2003, pp. 369-382.*

Tsuyoshi Murata and Sakiko Moriyasu, "Link Prediction of Social Networks Based on Weighted Proximity Measures", 2007 IEEE/WIC/ACM International Conference on Web Intelligence, 2007, pp. 85-88.*

Richter, Y., et al. (2010) Predicting customer churn in mobile networks through analysis of social groups. In Proceedings of the SIAM International Conference on Data Mining, Apr. 29-May 1, 2010, pp. 732-741, Society for Industrial and Applied Mathematics, 2010.

El-Yaniv, R., et al. (2008) Better multiclass classification via a margin-optimized single binary problem. Pattern Recognition Letters, vol. 29, Issue 14, Oct. 2008, pp. 1954-1959.

Kempe, D., et al. (2003), Maximizing the spread of influence through a social network. Proceeding KDD '03 Proceedings of the ninth ACM SIGKDD international conference on Knowledge discovery and data mining, pp. 137-14, ACM Press, New York, NY, USA, 2003.

Watts, D., et al. (2007), Viral marketing for the real world. Harvard Business Review, May 2007, p. 22.

Centola, D., et al. (2007), Complex contagions and the weakness of long ties. The American Journal of Sociology, vol. 113, Issue 3, pp. 702-734, 2007.

Dodds, P., et al. (2004), Universal behavior in a generalized model of contagion, Physical review letters, vol. 92, Issue 21, p. 218701, 2004.

Banerjee, S., et al. (2004), Reaction diffusion processes on random and scale-free networks, ArXiv preprint cond-mat/0404640, Apr. 27, 2004.

Meloni, S., et al. (2009), Traffic-driven epidemic spreading in finite-size scale-free networks. Proceedings of the National Academy of Sciences of the United States of America, Oct. 2009, vol. 106, Issue 40, pp. 16897-16902.

Leskovec, J., et al. (2005), Graphs over time: densification laws, shrinking diameters and possible explanations, in: Proceedings of the eleventh ACM SIGKDD international conference on Knowledge discovery in data mining, ACM Press, 2005, pp. 177-187.

* cited by examiner

METHODS AND APPARATUS FOR PREDICTION AND MODIFICATION OF BEHAVIOR IN NETWORKS

RELATED APPLICATIONS

This application claims the benefit of U.S. Provisional Application Ser. No. 61/490,512, filed May 26, 2011, and of U.S. Provisional Application Ser. No. 61/537,539, filed Sep. 21, 2011. The entire disclosures of both of these provisional applications are herein incorporated by reference.

FIELD OF THE TECHNOLOGY

The present invention relates generally to predicting and modifying user behavior in a network.

SUMMARY

In exemplary implementations of this invention, mobile application (app) installations by users of one or more networks are predicted. Smartphones gather network data. From this data, multiple graphs are calculated. For example, the graphs may comprise a call log graph (with edges weighted by number of calls between nodes), a text message graph (with edges weighted by number of text messages between nodes), a Bluetooth® proximity graph, a co-location graph (from GPS data), a friendship graph (from Facebook®), and an affiliation graph (from contacts). These "candidate" graphs are weighted by an optimization vector. A summation of these weighted candidate graphs is used to calculate a composite graph.

The composite graph is used to predict the conditional probabilities that the respective users will install an app, depending in part on whether the user's neighbors in the composite graph have previously installed the app. Exogenous factors, such as the app's quality or overall popularity, may be taken into account by creating a virtual candidate graph.

The conditional probabilities may be used to select a subset of the users. Signals may be sent to the subset of users, including to recommend an app or another purchase, or to promote an idea.

This invention is not limited to predicting installation of apps. For example, in some implementations, this invention can be used to predict the conditional probability of a user taking any action, including adopting an idea.

In exemplary implementations of this invention, "trend ignition" in a social-influence campaign in a network is predicted. For example, network data may be used to predict the probability that a certain portion of the user population of a network will adopt an idea (due to diffusion of the idea through the network), if a specific portion number of users in the network are initial "seeds" for that idea (persons who adopt the idea initially). This enables campaign managers to allocate resources efficiently.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIGS. 3A, 4A and 5A show campaign success probability as a function of percentage of the network population who are seeds. FIGS. 3B, 4B and 5B show efficiency (campaign success probability divided by cost) as a function of percentage of the network population who are seeds. In FIGS. 3A and 3B, the campaign goal is to convince 20% of the user population. In FIGS. 4A and 4B, the campaign goal is to convince 42% of the user population. In FIGS. 5A and 5B, the campaign goal is to convince 50% of the user population.

The above Figures illustrate some illustrative implementations of this invention, or provide information that relates to those implementations. However, this invention may be implemented in many other ways. The above Figures do not show all of the details of this invention.

DETAILED DESCRIPTION

In exemplary implementations of this invention, the installation of mobile applications (referred as "apps") is predicted, using data gathered from smart phones. Different types of networks can be inferred from this data, including a call log network and a Bluetooth® proximity network. This data obtained from smartphones, regarding multiple networks, is used for app installation prediction.

Smart phones can easily sense multiple networks using built-in sensors and software: For example: The call logs can be used to form phone call networks. Bluetooth® radio can be used to infer proximity networks. GPS data can be used to infer user moving patterns, and furthermore their working places and affiliations. Social network tools (such as the Facebook® app and the Twitter® app) can observe users' online friendship network.

In exemplary implementations of this invention, an optimal composite network (the network that best predicts app installation) is inferred from multiple layers of different networks easily observed by smart phones, rather than using a single actual network to predict app installation.

Some conventional methods of network analysis assume that the network is the only mechanism for adoption. The only way to get the flu is to catch the flu from someone else, and the only way to retweet is to see the tweet message from someone else. For mobile app, however, this is not true at all. Any user can simply open the App Store® (on iPhones®) or Google Play® Store (on Android™ phones), browse over different lists of apps, and pick the one that appears most interesting to the user to install without peer influence. One big challenge, which makes modeling the spreading of apps difficult, is that one can install an app without any external influence and information.

The individual behavioral variance in app installation is so significant that any network effect might, in some cases, be rendered unobservable from the data. For instance, some tech savvy "early adopter" users may try and install all hot apps on the market, while many inexperienced users find it troublesome even to go through the process of installing an app, and as a result they only install very few apps.

There are exogenous factors in the app installation behaviors. One particular factor is the popularity of apps. For instance, the Pandora® Radio app may be vastly popular and highly ranked in the app store, while most other apps are not. (In exemplary implementations of this invention, this issue is taken into account too. Exogenous factors can play an important in increasing prediction precision.)

In an illustrative test of a prototype of this invention, each of 55 participants are given an Android™-based cell phone with built-in sensing software. The software runs in a passive manner, and does not interfere with the normal usage of the phone. The software can capture all call logs. In this test, a call log network between all participants is obtained by treating participants as nodes and the number of calls between two nodes as weights for the edge in-between. The software also scans near-by phones and other Bluetooth® devices every five minutes to capture the proximity network between individuals. The counts on the number of Bluetooth® hits are used as edge weights similar to the call log network. The affiliation network and the friendship network are collected by deploying a survey, which lists all the participants and asks each one to list their affiliations (e.g., in the case of a student, the student's academic department), and rate their relationships with everyone else in the 55 participant group. Alternately, the affiliation network can also be inferred by using phone GPS/cell tower information. Also, alternately, a friendship network may be obtained from smart phones by collecting data from social networking apps such as the Facebook® and Twitter® apps.

In this prototype, the four networks comprise: (1) a call log network $G^c$, which comprises an undirected, weighted graph, with weight being determined by number of calls; (2) a Bluetooth® proximity network $G^b$, which comprises an undirected, weighted graph, with weight being determined by number of Bluetooth® scan hits; (3) a friendship network $G^f$, which comprises an undirected, binary graph (this graph based on survey results, 1: friend; 0, not friend) and (4) an affiliation network $G^a$, which comprises an undirected, binary graph (this graph based on survey results, 1: same; 0, different). As used herein, each of these four networks is a "candidate network"

In some implementations of this invention, network data can be obtained from phone sensors and user accounts.

In an illustrative test of a prototype of this invention, a built-in sensing platform constantly monitors the installation of mobile apps. Every time a new app is installed, this information is collected and sent back to a server within a day. In this test, apps have a power-law distribution of users, which suggests that most apps in the test have a very small user pool, and very few apps have spread broadly. In this test, the variance of individual users is significant: There are users having more than 100 apps installed, and there are users having only a couple of apps.

In exemplary implementations of this invention, the following model may be used for describing and predicting app installation behaviors in networks. G denotes the adjacency matrix for graph G. Each user is denoted by $u \in \{1, \ldots, U\}$. Each app is denoted by $a \in \{1, \ldots, A\}$. The binary random variable $x_u^a$ to represent the status of adoption (i.e. app installation): $x_u^a=1$ if a is adopted by user n, 0 if not. The different social relationship networks (graphs) that can be inferred by phones are denoted by $G^1, \ldots, G^M$. The model aims at inferring an optimal composite network $G^{opt}$ with better predictive power than any of the actual candidate networks. The weight of edge $e_{i,j}$ in graph $G^m$ is denoted by $w_{i,j}^m$. The weight of an edge in $G^{opt}$ is denoted by $w_{i,j}$.

A mathematical model employed in this prototype employs a non-negative accumulative assumption. $G^{opt}$ is defined to be:

$$G^{opt} = \sum_m \alpha_m G^m, \text{ where } \forall m, \alpha_m \geq 0 \quad (1)$$

An intuition behind this non-negative accumulative assumption is as follows: If two nodes are connected by a certain type of network, their app installation behaviors may or may not correlate with each other. On the other hand, if two nodes are not connected by a certain type of network, the absence of the link between them should lead to neither positive or negative effect on the correlation between their app installations.

This non-negative assumption can bring significant improvement in prediction. The non-negative assumption also makes the model stochastic. This model can take binary graphs as well by treating them as weighted graphs. $\alpha_1, \ldots, \alpha_M$ are the non-negative weights for each candidate network in describing the optimal composite network. The vector $(\alpha_1 \ldots, \alpha_m)$ may be referred to as the "optimal composite vector".

The network potential $p_a(i)$ is defined as:

$$p_a(i) = \sum_{j \in \mathcal{N}(i)} w_{i,j} x_j^a, \quad (2)$$

where the neighbor of node i is defined by:

$$\mathcal{N}(i) = \{j | \exists m \text{ s.t. } w_{i,j}^m \geq 0\} \quad (3)$$

The potential $p_a(i)$ can also be decomposed into potentials from different networks:

$$p_a(i) = \sum_m \alpha_m \underbrace{\left( \sum_{j \in \mathcal{N}(i)} w_{i,j}^m x_j^a \right)}_{p_a^m(i)}, \quad (4)$$

where $p_a^m(i)$ is the potential computed from one single candidate network.

One can think of $p_a(i)$ as the potential of i installing app a based on the observations of its neighbors on the composite network.

The conditional probability that the app is adopted or will be adopted is defined as:

$$\text{Prob}(x_u^a = 1 | x_{u'}^a : u' \in \mathcal{N}(u)) = 1 - \exp(-s_u \cdot p_a(u)), \quad (5)$$

where $\forall u, s_u \geq 0$. $s_u$ captures the individual susceptibility of apps, regardless of which app.

This exponential function $f(x)=1-\exp(-x)$ is preferable, because it can yield the best performance. Also, advantageously, it forms a concave optimization problem during maximum likelihood estimation in model training.

In this prototype implementation, model training is employed. During the training phase, optimal values for $\alpha_1, \ldots, \alpha_M$ and $s_1, \ldots, s_U$ are estimated. The model training may be formalized as an optimization problem by maximizing the sum of all conditional likelihood. Given all candidate networks, a training set composed of a subset of apps TRAIN $\subset \{1, \ldots, A\}$, and $\{x_u^a : \forall a \in \text{TRAIN}, u \in \{1, \ldots, U\}\}$, compute:

$$\arg \max s_1, \ldots, s_U, \alpha_1, \ldots, \alpha_m f(s_1, \ldots, s_U, \alpha_1, \ldots, \alpha_M) \text{ Subject to } \forall u, s_u \geq 0, \forall m, \alpha_m \geq 0 \quad (6)$$

where:

$$f(s_1, \ldots, s_U, \alpha_1, \ldots, \alpha_M) = \log \left[ \prod_{a \in TRAIN} \prod_{u: x_u^a = 1} \text{Prob}(x_u^a = 1 \mid x_{u'}^a : u' \in \mathcal{N}(u)) \right. \quad (7)$$

$$\left. \prod_{u: x_u^a = 0} (1 - \text{Prob}(x_u^a = 1 \mid x_{u'}^a : u' \in \mathcal{N}(u))) \right] \quad (8)$$

$$= \sum_{a \in TRAIN} \left[ \sum_{u: x_u^a = 1} \log(1 - \exp(-s_u - p_a(u)) - \sum_{u: x_u^a = 0} (s_u + p_a(u)) \right]$$

This model training is a concave optimization problem. Therefore, global optimal is guaranteed, and there exist efficient algorithms scalable to larger datasets. For example, a MATLAB® built-in implementation may be employed.

In this prototype, $G^{opt}$ is computed from existing candidate networks. In this prototype, an additional regularization term or tuning parameter is not used in the optimization process.

In this prototype, the algorithm does not distinguish causality in network effects: i.e., the algorithm does not identify why network neighbors have similar app installation behaviors. For example, the reason might be diffusion (i.e. my neighbor tells me), or homophily (i.e. network neighbors share same interests and personality).

Obvious exogenous factors include the popularity and quality of an app. The popularity and quality of an app will affect the ranking and review of the app in the App Store®/Google Play® Store, and as a result higher/lower likelihood of adoption. In exemplary implementations, an exogenous factor can be modeled by introducing a virtual graph $G^p$, which can be plugged into the composite network framework. $G^p$ is constructed by adding a virtual node U+1 and one edge $e_{U+1,u}$ for each actual user u. The corresponding weight of each edge $w_{U+1,u}$ for computing $p_a(u)$ is $C^a$, where $C^a$ is a positive number describing the popularity of an app. For example, the overall number of installations of the app in a community may comprise $C^a$. Alternately, $C^a$ can be obtained by counting app downloads and app ranks. Exogenous factors can also increase accuracy in measuring network effects for a non-trivial reason: Consider a network of two nodes connected by one edge, and both nodes installed an app. If an app is very popular, then the fact that both nodes have this app may not imply a strong network effect. On the contrary, if this app is very uncommon, the fact that both nodes have this app implies a strong network effect. Therefore, in exemplary implementations, introducing exogenous factors can help an algorithm better calibrate network weights.

In exemplary implementations, an algorithm predicts the probability of adoption (i.e. installing an app) given its neighbor's adoption status. $p_t \in [0,1]$ denotes the predicted probability of installation, while $x_t \in \{0,1\}$ denotes the actual outcome.

In a test of a prototype of this invention, five different configurations were employed: (1) modeling both individual variance and network effects; (2) modeling both individual variance and network effects, but excluding the virtual network $G^p$ that captures exogenous factors; (3) modeling with only individual variance (by forcing $\alpha_m = 0$ in Eq. 6), (4) modeling with only network effects (by forcing $s_u = 0$, $\forall u$), and (5) modeling with network effects while allowing the composite vector to be negative.

The results of this test indicate that app installations are highly predictable with individual variance and network information. These results indicate that (i) individual variance, (ii) network effects and (iii) exogenous factors modeled by $G^p$ can all play important roles in app installation.

In exemplary implementations of this invention, computing the composite network and taking into account exogenous factors can vastly improve predictive performance.

In exemplary implementations of this invention, future app installations are predicted. In these implementations, predicting future app adoption at time t is equivalent to predicting installation with part of the neighbor adoption status unknown. These unknown neighbors who haven't adopted at time t may or may not adopt at t'>t. Though the algorithm is trained without the information of time of adoption, the inferred individual variance $s_u$ and composite vector $(\alpha_1, \ldots, \alpha_M)$ can be used to predict future app adoption.

In some cases, it is not possible to observe the app installation for all users due to privacy reasons. In these cases, it may be possible to observe and instrument only a small subset of a community. Even in those cases, app installations can be predicted. To formally state this problem, assume that all the nodes 1, . . . , U are divided into two groups: the observable group G1 and the unobservable group G2.

In some implementations of this invention, during cross validation, only nodes in the observable group are accessible to algorithms in the training process, and nodes in the unobservable group are tested with the prediction algorithms. The individual variance $s_u$, u∈G1 is computed in the training process, $S_u$, u'∈G2 for Eq. 5 is not available in the testing phase. Even trained on a different set of subjects without calibrating users variance, the composite vector learned by the algorithm can be applied to another set of users.

Figure 1:
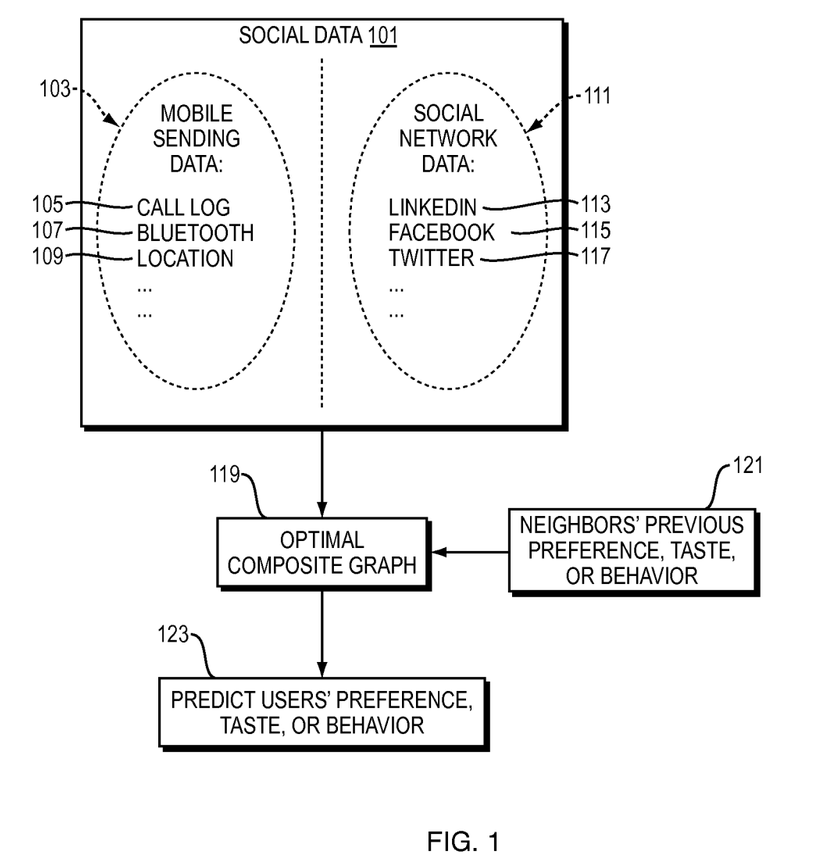
FIG. 1 is a high level flowchart of a method of predicting user behavior, using a composite graph.

FIG. 1 is a high level flowchart of a method of predicting user behavior. Network social data 101 is gathered. For example, smartphones may gather mobile sending data 103, including a call log 105, Bluetooth® proximity data 107, and GPS location data 109. Also, smartphones may gather social network data 111, including data from the LinkedIn® app 113, Facebook® app 115, and Twitter® app 117. Using this network data 101 and data regarding previous preference, taste or behavior of the user's "neighbors" in the network 121, one or more processors may calculate an optimal composite graph 119. This composite graph 119 may be used to predict a user's behavior, taste or preference 123.

Figure 2:
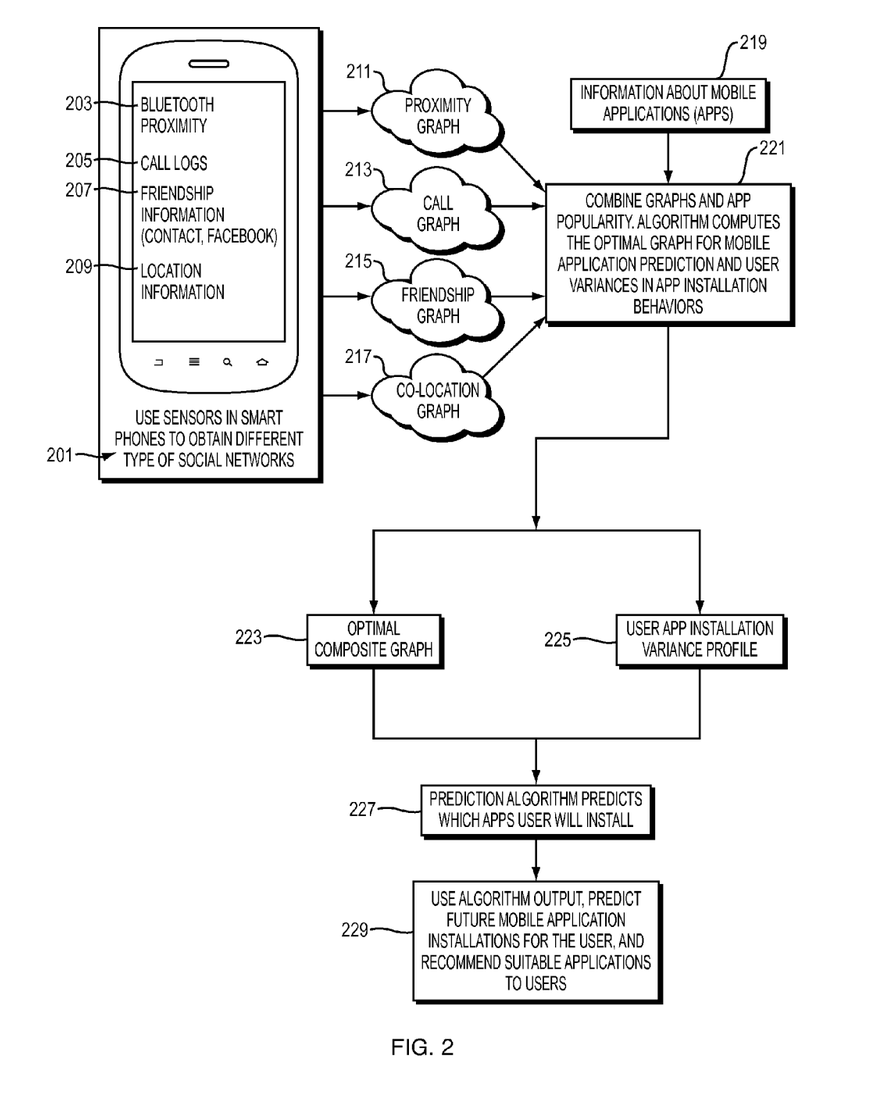
FIG. 2 is a high level flowchart of a similar algorithm for predicting user behavior.

FIG. 2 is a high level flowchart of a similar algorithm for predicting user behavior. Sensors in smart phones are used to obtain data regarding different types of social networks 201. For example, the data may include Bluetooth® proximity 203, call logs 205, friendship information (e.g., in Facebook® or a contacts list) 207, or location information 209. This data may be used to calculate, for example, a proximity graph 211, a call network 213, a friendship graph 215 or a co-location graph 217. These graphs (and information about the app, e.g., an exogenous factor 219) may be used to calculate an optimal composite graph 223. A user app installation variance profile 225 is calculated. A prediction algorithm uses the optional composite graph 223 and variance profile 225 in order to predict the apps that a user will install 227. Using output from the algorithm, future mobile app installations for the user are predicted and suitable applications are recommended to users 229.

In exemplary implementations, this invention also comprises a "trends ignition" algorithm for predicting the outcome of a social-influence based campaign in a network. For example, the trends ignition algorithm may be used (1) to select an initial group of engaged people in a social-influence based campaign; (2) predict the probability that a given social-influence based campaign will succeed in achieving a given goal (defined as convincing at least some given portion of the population), and (3) predict the "epidemic proliferation" of the campaign.

The properties that can be controlled by the campaign managers, and can hence be calibrated in this trends ignition model, include: (a) the percentage of the population that act as initial seeds (that is, who initially adopt a behavior and from whom the behavior spreads by social diffusion), (b) the amount of resources allocated to acquire these seeds (e.g., by directly interacting with the initial seeds to convince them to adopt the behavior), (c) the goal of the campaign, namely— the amount of population that is expected to be convinced (notice that exposure does not necessarily guarantee persuasion! This trends ignition model assumes that probability of persuasion increases with the number and intensity of exposure, both direct and socially transferred); and (d) the identities of the members that are engaged directly.

The trends ignition model also takes into account properties that the campaign managers cannot control, such as the size of the overall population, social interactions between the members, history of previous campaigns etc. For each set of values for these properties, this model can provide analytic lower and upper bounds for the success of the specific campaign.

In addition, using the trends ignition model, an optimal assignment (or an approximation thereof) of resources can be calculated, yielding a more efficient campaign, for any given network.

Figure 3A:
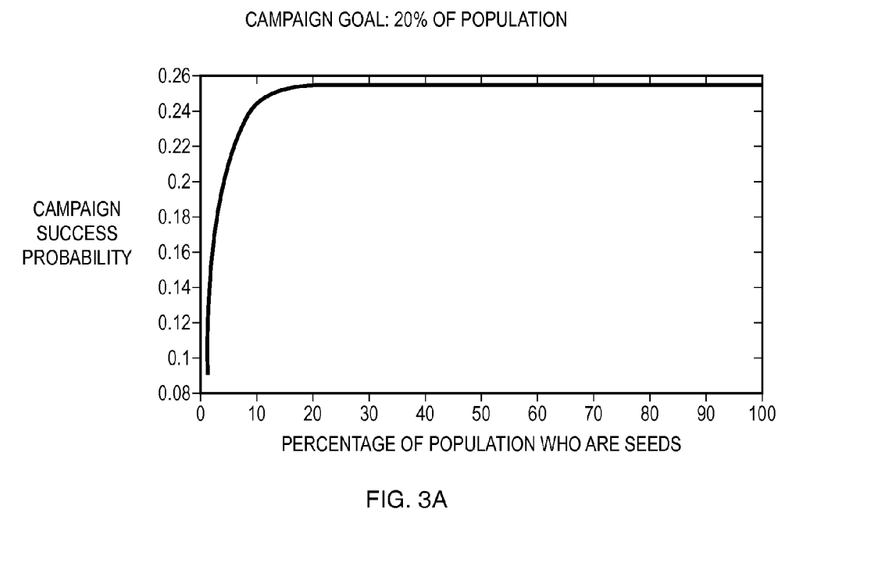
FIGS. 3A, 3B, 4A, 4B, 5A and 5B are diagrams that show calculated results of a trends ignition algorithm, in an illustrative test of a prototype.
Figure 3B:
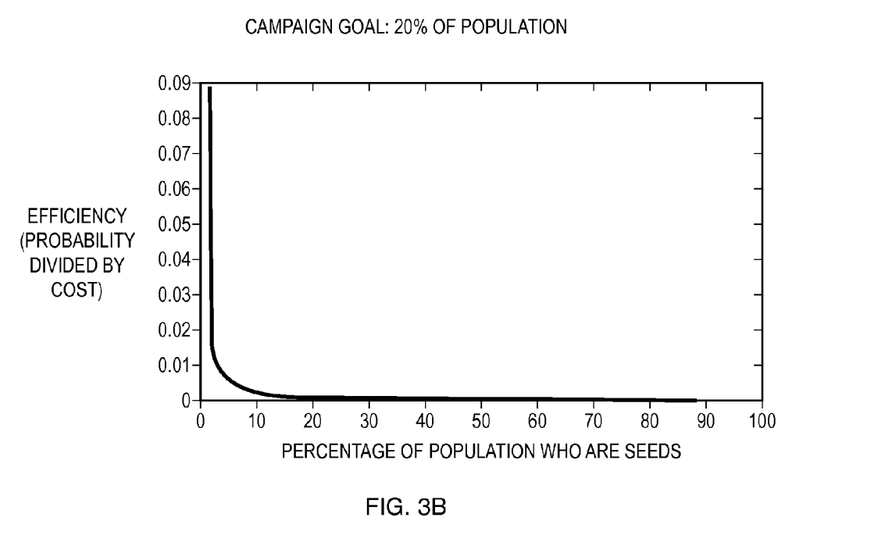
Figure 4A:
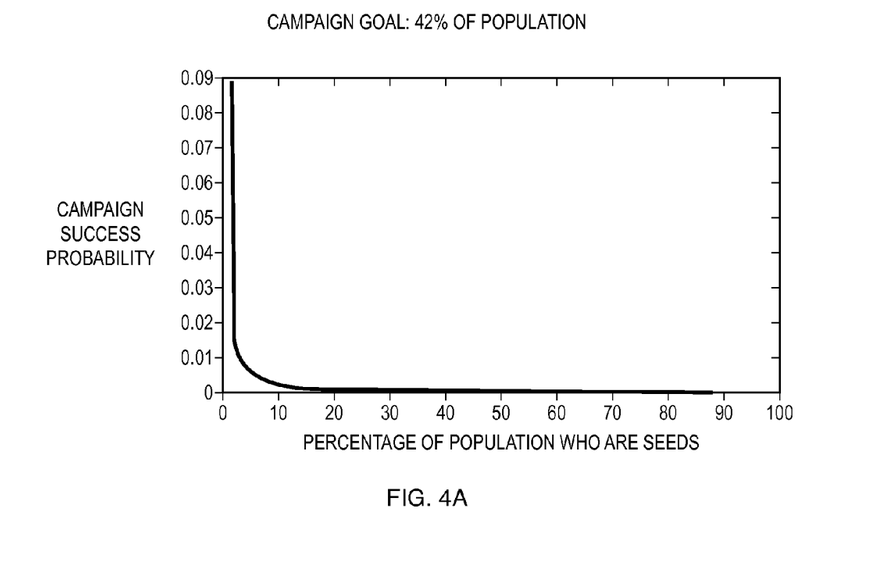
Figure 4B:
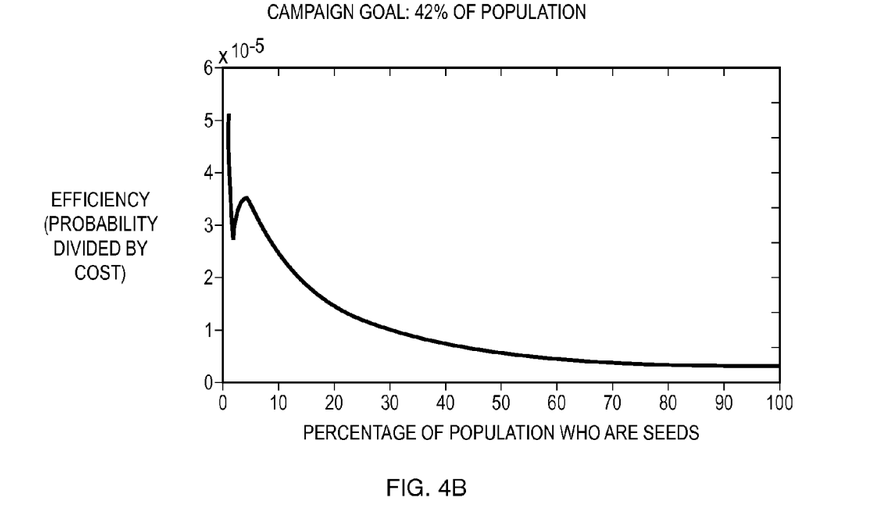
Figure 5A:
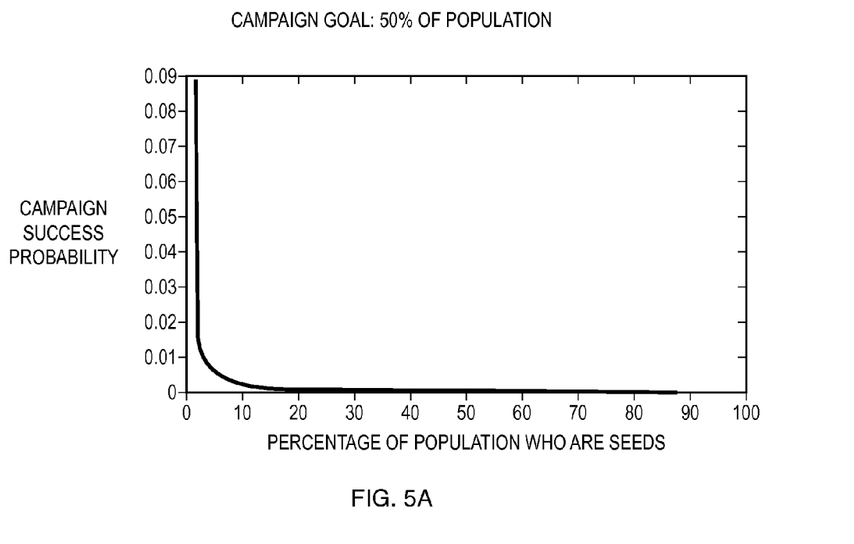
Figure 5B:
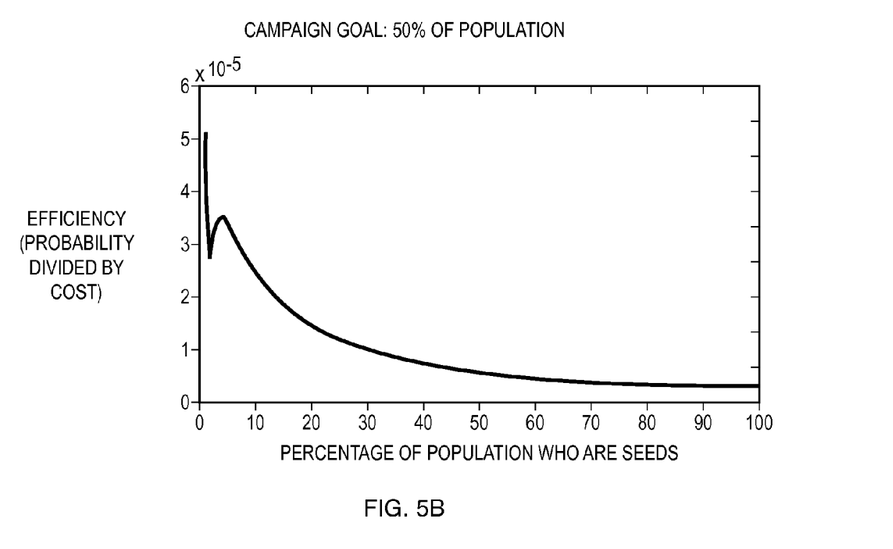

FIGS. 3A, 3B, 4A, 4B, 5A and 5B are diagrams that show results calculated by a trends ignition algorithm, in an illustrative test of a prototype. FIGS. 3A, 4A and 5A show campaign success probability as a function of percentage of the network population who are seeds. FIGS. 3B, 4B and 5B show efficiency (campaign success probability divided by cost) as a function of percentage of the network population who are seeds. In FIGS. 3A and 3B, the campaign goal is to convince 20% of the user population. In FIGS. 4A and 4B, the campaign goal is to convince 42% of the user population. In FIGS. 5A and 5B, the campaign goal is to convince 50% of the user population.

The charts shown in FIGS. 3A, 3B, 4A, 4B, 5A and 5B can be used to illustrate ways in which the trends ignition model can be used by campaign managers that have to select the optimal resources that be allocated to campaigns, and the optimal properties of campaigns, based on the requirements from the campaigns (portion of population to convince).

Here are seven examples for how the trends ignition model can be applied:

First, curves in the charts on FIGS. 3A, 4A, 5A (representing upper bound on the success probability) quickly converge to their asymptote, which changes as a function of the portion of the population to convince. Using this correlation, a graph showing of the success probability as a function of the portion of population to be convinced can be obtained. Such a graph gives a clear bound for what can a campaign reach for some community, assuming an unlimited budget. This would provide a valuable tool for decisions makers who could use it to: (a) set achievable marketing goals; (b) select target markets and assess their overall potential (as different communities will generate different graphs), (c) allocate marketing budgets between different types of campaigns and media channels (as a different campaign would have different influence properties, and would generate different graphs), and (d) measure in real time the success of ongoing campaigns and stop them once they reach their upper bound (thus saving resources).

Second, optimal marketing goals may be found. By multiplying success probability by portion of population to be convinced, an upper bound on the expected population to be convinced is produced, as a function of the population to be convinced. Selecting the point with the highest expected value can result in a potent campaign.

Third, for every value of "portion of population to be convinced" there is a value of portion of population engaged directly after which the value of the function is very close to the asymptote (to be denoted as "critical investment value"). Multiplying this critical investment value by the graph contemplated by the preceding paragraph can results in a graph showing the cost-efficiency of campaigns. Namely, the expected value, as a function of cost, as a function of the population to be convinced. This can be used to define the most cost-efficient campaigns achievable.

Fourth, for campaigns of limited budget and fixed goals, the charts in FIGS. 3B, 4B, 5B demonstrate the relative utilization of every dollar in maximizing the success probability of a given campaign. Notice that these graphs are not always monotonous. The peak (or peaks) in the resource utilization curve of these graphs, subject to constraints of total available budget (cutoff of the graphs at some point on the X-axes) would yield the most cost-efficient campaign, for a fixed given goal.

Fifth, a minimum acceptable response percentage' constraint may be calculated by removing the left part of the curve (e.g., in FIGS. 3A, 4A, 5A), for which the success probability (as predicted by the corresponding success probability graph) is smaller than the requested constraint.

Sixth, an optimization can be achieved by dividing the campaign into several separate campaigns. Using the same overall budget, several smaller campaigns can be launched, having success probabilities $P_1, P_2, \ldots, P_n$. Their overall success probability would therefore be $P=1-(1-P_1)(1-P_2)\ldots(1-P_n)$. This probability may be larger than the probability of a single campaign that uses all the resources for achieving a maximal direct engagement.

Seventh the optimal division of a campaign to a sequence of separate campaigns of various properties, using a given budget, may be calculated. Further optimization can take place by selecting the initial group of seeders (in these example a random group was assumed). Using various analytic of numerical methods, higher predicted values may be achieved by selecting the optimal group of initial seeders.

Here is a more detailed description of the trends ignition model, including equations and definitions. The 15 definitions labeled below as Definition 1 to Definition 15, and Equations 9 to 12, and the text below that is interspersed among those definitions and equations, all relate to the trends ignition algorithm, and do not (unless expressly noted otherwise) relate to the composite graph algorithm described above.

Let G(V,E) be a graph representing a given social network, of $|V|=n$ members, having $|E|$ social links among themselves. For example, G(V,E) may be an actual "candidate" network or may be a composite graph calculated according to Equation 1. Assume that a goal is to turn some "idea" into a "trend".

Using empirical observations, the following the following five properties of any given idea can be measured:

Definition 1: Let $p_N$ denote the density of the network G, namely, the average number of friends of the network's users.

Definition 2: Let TTL denote the average lifespan of the idea. Namely, the number of time units (for example, days)

that this idea is still considered an attractive topic of conversation, or presentation in any other way.

Definition 3: Let $\alpha$ denote the average initial proliferation factor of the idea. Namely, the average number of friends someone who were directly engaged by us during the "seeding" stage of the campaign will be talking about the idea with. Notice that this parameter depends on the attractiveness of the idea, as well as the aggressiveness of our campaign (i.e. the direct persuasion we apply).

Definition 4: Let $\beta > 0$ denote the average extended proliferation factor of the idea. Namely, the average number of friends someone who exposed to the idea after the "seeding" stage of the campaign will be talking about the idea with.

Definition 5: Let $\mathcal{N}_{v,a}(t)$ denote the number of friends of user v that at time t are exposing v to the idea a.

Assume that a campaign can approach any number of the networks' members and convince them in some way to adopt the idea the campaign is trying to behave. Naturally, the larger the group of people that are directly approached (and to whom the idea is directly promoted) the more expensive this campaign would become. However, an expensive and successful campaign may still be considered better than a cheap and failing one.

The probability of a successful marketing campaign is defined as follows:

Definition 6:

$$P_{Trend}\left(TTL, \frac{k}{n}, \varepsilon\right)$$

denotes the probability that a direct promotion to a group of k members will result in convincing at least $\varepsilon \cdot n$ of the network's members to adopt the idea we are promoting (for some $$\left(\text{for some } \varepsilon > \frac{k}{n}\right)$$

Definition 7:

$$P_{\rho-Trend}\left(TTL, \rho, \frac{k}{n}, \varepsilon\right)$$

denotes the probability that a direct promotion to a group of k members will result in exposing at least $\varepsilon \cdot n$ of the network's members to the idea we are promoting, by at least $\rho$ of their friends.

Consider what happens after initially "seeding" an idea a within the initial group of k people. Notice that "exposures" to ideas are transitive. Namely, an "exposing" user generates "exposure agents" which can be transmitted on the network's social links to "exposed users", which can in turn transmit them onwards to their friends, and so on. The idea's exposure interactions can be modeled as movements of random walking agents in a network. Every user that was contacted directly at the seeding stage generates $\alpha$ such agents. Regarding the proliferation of the idea in later stages of the exposure chain, assume that the proliferation factor for people not contacted by the campaign directly would be between 1 and $\alpha$.

The probability that a campaign that directly approaches k members will be able to make at least an $\varepsilon$ portion of the network's users be exposed to some idea, by at least $\rho$ of their friends, is:

$$P_{\rho-Trend}\left(TTL, \rho, \frac{k}{n}, \varepsilon\right) \leq 1 - \Phi\left(\sqrt{n} \cdot \frac{\varepsilon - \tilde{P}}{\sqrt{\tilde{P}(1-\tilde{P})}}\right) \quad (9)$$

where:

$$\tilde{P} = \left(\frac{TTL \cdot \left(1 - e^{-\frac{3\alpha \cdot \beta^t \cdot k}{2n\left(1 - \frac{1}{E[deg]}\right)}}\right)}{\rho}\right)^{\rho} \cdot e^{\left(\rho - TTL\left(1 - e^{-\frac{3\alpha \cdot \beta^t \cdot k}{2n\left(1 - \frac{1}{E[deg]}\right)}}\right)\right)}$$

and where $\Phi(x)$ is the cumulative normal distribution function, defined as~:

$$\Phi(x) = \frac{1}{\sqrt{2\pi}} \int_{-\infty}^{x} e^{-\frac{1}{2}t^2} dt$$

and also provided that:

$$\rho > TTL \cdot \left(1 - e^{-\frac{3\alpha \cdot \beta^t \cdot k}{2n\left(1 - \frac{1}{E[deg]}\right)}}\right)$$

Preferably, Equation 9 is used for calculations involving a random network.

An explicit upper bound over the campaign success probability can be calculated as follows: The probability that a campaign that addresses k members will be able to make at least an $\varepsilon$ portion of the network's users to adopt some idea is:

$$P_{Trend}\left(TTL, \frac{k}{n}, \varepsilon\right) \leq P_{Local-Adopt}^{\varepsilon \cdot n} \cdot \left(1 - \Phi\left(\sqrt{n} \cdot \frac{\varepsilon - \tilde{P}}{\sqrt{\tilde{P}(1-\tilde{P})}}\right)\right) \quad (10)$$

where:

$$\tilde{P} = e^{\left(\rho_{opt} - TTL\left(1 - e^{-\frac{3\alpha \cdot \beta^t \cdot k}{2n\left(1 - \frac{1}{E[deg]}\right)}}\right)\right)} \cdot \left(\frac{TTL \cdot \left(1 - e^{-\frac{3\alpha \cdot \beta^t \cdot k}{2n\left(1 - \frac{1}{E[deg]}\right)}}\right)}{\rho_{opt}}\right)^{\rho_{opt}}$$

and where:

$$\rho_{opt} \triangleq \underset{\rho}{\operatorname{argmax}}\left(P_{Local-Adopt}^{\varepsilon \cdot n} \cdot P_{Trend}\left(TTL, \rho, \frac{k}{n}, \varepsilon\right)\right)$$

as bounded by Equation 11, and provided that:

$$\rho_{opt} > TTL \cdot \left(1 - e^{-\frac{3\alpha \cdot \beta^t \cdot k}{2n\left(1 - \frac{1}{E[deg]}\right)}}\right)$$

Preferably, Equation 10 is used for calculations involving a random network.

Definition 8: Let $P_{Local-Adopt}$ denote the probability of local adoption of an idea. The probability may be different for each user, and may depend on properties such as the network's topology, relations between members, etc.

Definition 9: Let $\rho_{opt}$ be the optimal value of $\rho$ for every set of values of $\epsilon$, k and TTL:

$$\rho_{opt} \stackrel{\Delta}{=} \underset{\rho}{\mathrm{argmax}} P_{Trend}\left(TTL, \rho, \frac{k}{n}, \varepsilon\right)$$

as bounded by Equation 11, and provided that:

$$\rho_{opt} > TTL \cdot \left(1 - e^{\frac{3\alpha \cdot \beta^t \cdot k}{2n\left(1-\frac{1}{E[deg]}\right)}}\right)$$

Now assume that the network comprises (or can be approximated by) a scale free network $G(n,c,\gamma)$, namely, a network of n users where the probability that user v has d neighbors follows a power law:

$$P(d) \sim c \cdot d^{-\gamma}$$

where both c and $\gamma$ are constants.

In some implementations, it is assumed that the initial group of seeds campaign is chosen by random. In other implementations, this assumption (that seeds are chosen at random) does not apply.

At the "seeding" stage of the campaign k members of the scale free network are approached directly. Those members generate on average $\alpha$ "agents" sent along the social links to their friends, creating chains of length TTL, and a total of $\alpha \cdot \beta^t \cdot k$ active agents.

Definition 10: $P_\Delta$ denotes the probability that two vertices will have degrees ratio of $\Delta$ or higher:

$$P_\Delta \stackrel{\Delta}{=} \mathrm{Prob}[\deg(u) > \Delta \cdot \deg(v)]$$

A lower bound for the success probability of a campaign can be constructed as follows, regardless of the specific value of $\rho$:

The probability that a campaign that directly approaches k members will be able to make at least an $\epsilon$ portion of the network's users be exposed to some idea, by at least $\rho$ of their friends, is upper bounded as follows:

$$P_{\rho-Trend}\left(TTL, \rho, \frac{k}{n}, \varepsilon\right) \leq 1 - \Phi\left(\sqrt{n} \cdot \frac{\varepsilon - \tilde{P}_+}{\sqrt{\tilde{P}_+(1-\tilde{P}_+)}}\right) \quad (11)$$

where:

$$\tilde{P}_+ = \left(\frac{TTL \cdot \sigma_+}{\rho}\right)^\rho \cdot e^{(\rho - TTL \cdot \sigma_+)}$$

and where $\Phi(x)$ is the cumulative normal distribution function, defined as:

$$\Phi(x) = \frac{1}{\sqrt{2\pi}} \int_{-\infty}^x e^{-\frac{1}{2}t^2} dt$$

and also provided that:

$$\rho > TTL \cdot \sigma_+$$

Preferably, Equation 11 is used for calculations involving a scale free network.

Definition 11: $\sigma_+$ and $\sigma_-$ denote the upper and lower exposure resistance, respectively, of the scale free network:

$$\sigma_+ \stackrel{\Delta}{=} \min\left\{\begin{array}{l} 1 \leq d \leq 2 \\ 1 \leq \Delta \end{array} \middle| 1 - e^{-\Delta \cdot d \cdot \frac{\alpha \cdot \beta^t \cdot k}{n}} \cdot \left(1 - c \cdot \frac{1 - \frac{d-1^{\gamma-1}}{d}}{\gamma - 1}\right) \cdot (1 - P_\Delta)\right\}$$

$$\sigma_- \stackrel{\Delta}{=} \max\left\{1 \leq \Delta \middle| 1 - e^{-\Delta \cdot \frac{\alpha \cdot \beta^t \cdot k}{n}} \cdot (1 - P_\Delta)\right\}$$

Definition 12 is the same as Definition 8.

Definition 13: Following are two special optimized values of $\rho$:

$$\rho_{opt_+} \stackrel{\Delta}{=} \underset{\rho}{\mathrm{argmax}} P_{Trend}\left(TTL, \rho, \frac{k}{n}, \varepsilon\right)$$

provided that $\rho_{opt_+} > TTL \cdot \sigma_+$.

$$\rho_{opt_-} \stackrel{\Delta}{=} \underset{\rho}{\mathrm{argmin}} P_{Trend}\left(TTL, \rho, \frac{k}{n}, \varepsilon\right)$$

provided that $\rho_{opt_-} < TTL \cdot \sigma_-$.

As noted above in the discussion regarding the composite graph algorithm, the probability of users installing mobile applications on their mobile device (as a function of the number and identities of their friends that were installing the same applications before) can be modeled as follows, for some user v:

$$P_{Local-Adopt}(v) = 1 - e^{-(s_v + p_a(v))}$$

where

Definition 14: For every member $v \in V$, $s_v \geq 0$ captures the individual susceptibility of this member, regardless of the specific application (or idea) in question.

Definition 15: $p_a(v)$ denotes the network potential for the user v with respect to the idea a, and is defined as the sum of network agnostic "social weights" of the user v with the friends exposing him with the idea a:

$$p_a(v) = \sum_{u \in \mathcal{N}_{v,a}} w_{v,u}$$

where $\mathcal{N}_{v,a}$ is the overall group of users exposing v to the idea a.

See the discussion above of the composite graph algorithm, for exact definitions and methods of obtaining $s_v$ and $w_{v,u}$. Notice also that both properties are idea-agnostic. However, while $s_v$ is evaluated once for each user and is network agnostic, $p_a(v)$ contributes network specific information and can also be used to decide the identity of the network's members that should be targeted in an initial campaign.

The probability that a campaign that addresses k members will be able to make at least an $\epsilon$ portion of the network's users to adopt some idea is:

$$P_{Trend}\left(TTL, \frac{k}{n}, \varepsilon\right) \le e^{-\varepsilon \cdot n \cdot \xi_G \cdot \xi_N^{\rho_{opt_+}}} \cdot \left(1 - \Phi\left(\sqrt{n} \cdot \frac{\varepsilon - \tilde{P}_+}{\sqrt{\tilde{P}_+(1-\tilde{P}_+)}}\right)\right) \quad (12)$$

$$P_{Trend}\left(TTL, \frac{k}{n}, \varepsilon\right) \ge e^{-\varepsilon \cdot n \cdot \xi_G \cdot \xi_N^{\rho_{opt_-}}} \cdot \left(1 - \Phi\left(\sqrt{n} \cdot \frac{\varepsilon - \tilde{P}_-}{\sqrt{\tilde{P}_-(1-\tilde{P}_-)}}\right)\right)$$

where:

$$\tilde{P}_+ = e^{(\rho_{opt_+} - TTL\sigma_+)} \cdot \left(\frac{TTL \cdot \sigma_+}{\rho_{opt_+}}\right)^{\rho_{opt_+}}$$

$$\tilde{P}_- = e^{-\left(\frac{TTL\sigma_-}{2} - \rho_{opt_-} + \frac{\rho_{opt_-}^2}{2TTL\sigma_-}\right)}$$

and where:

$$\rho_{opt_+} \triangleq \underset{\rho}{\operatorname{argmax}}\left(e^{-\varepsilon \cdot n \cdot \xi_G \cdot \xi_N^{\rho}} \cdot P_{Trend}\left(TTL, \rho, \frac{k}{n}, \varepsilon\right)\right)$$

$$\rho_{opt_-} \triangleq \underset{\rho}{\operatorname{argmin}}\left(e^{-\varepsilon \cdot n \cdot \xi_G \cdot \xi_N^{\rho}} \cdot P_{Trend}\left(TTL, \rho, \frac{k}{n}, \varepsilon\right)\right)$$

and provided that:

$$\rho_{opt_+} > TTL \cdot \sigma_+$$

$$\rho_{opt_-} < TTL \cdot \sigma_-$$

and where $\xi_G$ denotes the network's adoption factor and $\xi_N$ denotes the network's influence factor:

$$\xi_G = e^{-\frac{1}{n}\sum_{v \in V} s_v}$$

$$\xi_N = e^{-\frac{1}{n}\sum_{e(v,u) \in E} \left(\frac{w_{u,v}}{|N_v|} + \frac{w_{v,u}}{|N_u|}\right)}$$

Preferably, Equation 12 is used for calculations involving a scale free network.

DEFINITIONS AND CLARIFICATIONS

Here are a few definitions and clarifications. As used herein:

The terms "a" and "an", when modifying a noun, do not imply that only one of the noun exists.

An "action", "behavior" or "idea" includes a behavior, idea, preference, or taste. For example, engaging in an "action" or "behavior" includes adopting an idea, or acquiring a preference or taste. Also, an "action" or "behavior" includes adopting an idea, preference or taste.

The term "calculation" (or "computation") shall be construed broadly. For example, a "calculation" (or "computation") includes a calculation, computation, algorithm or estimation. The term "calculate" (and "compute") shall be construed in like manner.

A "composite graph" is a graph that is calculated using a summation of weighted graphs. For example, the left hand term in Equation 1 is a composite graph.

A "computer processor" is an electronic processor adapted to perform computations. For example, a microprocessor or CPU is a computer processor.

An "electronic component" is a component that includes electronic hardware.

Equations are numbered herein for ease of reference. The numbering for an equation may appear to the right, to the left, above or below the equation. For example, the number "(1)" appears to right of Equation 1. A reference to a particular equation (e.g., "Equation_") includes (i) the equation itself, (ii) all phrases that modify the equation, such as "where...", "provided that...", "subject to...", "such that..." and like phrases, and (iii) all definitions of terms used in the equation.

The fact that an "example" or multiple examples of something are given does not imply that they are the only instances of that thing. An example (or a group of examples) is merely a non-exhaustive and non-limiting illustration.

An "exogenous parameter" of an action is a parameter relating to the action generally. For example, if an action comprises downloading a mobile phone application (app), then both the quality of the app and the overall popularity of the app are exogenous parameters for that action.

The term "graph" shall be construed broadly. For example, a "graph" includes any kind of mathematical graph, including any abstract representation (or description) of a set of objects in which at least some pairs are connected by links. Also, for example, the term "graph" includes any simple graph, undirected graph, symmetric graph, directed graph, asymmetric graph, digraph, multigraph, pseudograph, mixed graph, oriented graph, finite graph, infinite graph, weighted graph, regular graph, complete graph, free-scale graph, random graph, unlabeled graph, vertex-labeled graph, edge-labeled graph, linear graph, bipartite graph, complete bipartite graph, tree, forest, cycle graph, conceptual graph, graphs that allow loops, graphs that allow multiple edges between two nodes, and graphs that include both loops and multiple edges between two nodes. The term "graph" is not limited to graphs that provide visual information (e.g., a diagram or chart) or to a physical network. Nodes in a graph are not limited to humans or network devices. Instead, a node in a graph may be of any type.

The term "include" shall be construed broadly, as if followed by "without limitation".

"Network data" includes data that relates to a network. For example, network data may include (i) data regarding physical proximity of other devices to a node in the network, (ii) metadata, logs or statistics regarding communications (e.g., phone calls or text messages) over the network, (iv) metadata, logs or statistics regarding postings (e.g., postings on a "wall" or page of a social networking site) made on a network, and (v) data regarding users of the network, including data contained in user profiles, data regarding friendships between users, and data regarding a user's membership in or affiliation with a group.

A "node device" means a physical device that is adapted to function as a node in a network of physical devices.

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

A "seed" comprises a node in a graph that both: (a) corresponds to a human user that has adopted a behavior at a particular time, and (b) functions as an origin for diffusion of the behavior in the graph after that time.

The term "human user" shall be construed broadly. Selecting a subset of human users may comprise, for example, selecting those users, or devices associated with those users, or MAC addresses, IP addresses or other identifying information associated with those devices. Also, a subset of "human users" that is selected may, for example, comprise those users, or devices associated with those users, or MAC addresses, IP addresses or other identifying information associated with those devices.

"Sending a signal" and like phrases shall be construed broadly. For example, providing information in a graphical user interface (including a GUI on a website) comprises sending a signal.

"Sending a signal to a human user" and like phrases shall be construed broadly. For example, sending a signal to a device operated by (or associated with) the user comprises sending the signal to the user.

The term "signal processor" shall be construed broadly. A "signal processor" includes any electronic processor for modifying a signal (including an analog signal, a stream of bits or data, or other digital signal). Non-limiting examples of a "signal processor" include: an encoder, decoder, transcoder, compressor, digital signal processor, analog signal processor, analog-to-digital converter, digital-to-analog converter, digital-to-digital converter, analog-to-analog converter, multiplexer, or apparatus for modulating or amplifying a signal.

A first equation and a second equation are "Similar" if (i) both equations have a unique solution, (ii) both equations have the same multiple solutions, or (iii) one of the two equations includes all of the terms in the other equation, even if all or some of the terms are weighted differently. For example, the fact that a term in one equation appears in the other equation but is multiplied by a different value (which itself may be a function) or raised by a different exponent (which itself may be a function) would not cause the two equations to be dissimilar. Also, for example, the fact that an additional term appears in one equation but not in the other equation would not make the two equations dissimilar. A computation is "Similar" to an equation if the computation (i) converges to (or approaches as a limit) a solution that is the same as a solution of the equation, (ii) has the same result as a solution of the equation, or (iii) one of the two includes all of the terms of the other (e.g., the computation includes all of the terms in the equation, or vice versa), even if all or some of the terms are weighted differently.

Two values are "substantially" equal if they differ by less than 10%. Two values differ "substantially" if they differ by 10% or more. Two values differ by a certain percent, if [(x−y)/x]×100 equals that certain percent, where x is the larger of the two values and y is the smaller of the two values.

A "trend ignition probability" is either (i) a conditional probability of a specified fraction of a population of human users of a network being exposed (by diffusion over the network) to a behavior, if a particular fraction of the population are seeds for that behavior, or (ii) a conditional probability of a specified fraction of a population of human users of a network adopting a behavior, if a particular fraction of the population are seeds for that behavior.

A "Type 1 Calculation" means a calculation that comprises, or that includes as a step, either (i) Equation 1, (ii) an equation that is Similar to Equation 1, or (iii) a computation that is Similar to Equation 1.

A "Type 5 Calculation" means a calculation that comprises, or that includes as a step, either (i) Equation 5, (ii) an equation that is Similar to Equation 5, or (iii) a computation that is Similar to Equation 5.

A "Type 6 Calculation" means a calculation that comprises, or that includes as a step, either (i) Equation 6, (ii) an equation that is Similar to Equation 6, or (iii) a computation that is Similar to Equation 6.

A "Type 11 Calculation" means a calculation that comprises, or that includes as a step, either (i) Equation 11, (ii) an equation that is Similar to Equation 11, or (iii) a computation that is Similar to Equation 11.

A "Type 12 Calculation" means a calculation that comprises, or that includes as a step, either (i) Equation 12, (ii) an equation that is Similar to Equation 12, or (iii) a computation that is Similar to Equation 12.

Some non-limiting examples of being "used" in a calculation are: (a) being at least part of the input to the calculation, (b) being an intermediate result in the calculation, or (c) being a step of the calculation.

Variations

This invention may be implemented in many different ways. Here are some non-limiting examples.

The network information that can be used is not limited to social networks, but can also include mobile networks, proximity networks, and any other type of interaction that can generate an influence and affect the behavior of the interacting members.

Equations 1 to 6 are not limited to predicting installation of mobile phone apps, but may also be applied to predict any behavior of a user of a network, including buying another product or adopting an idea or acquiring a taste or preference.

Likewise, Equations 7 to 12 are not limited to trend ignition of an idea, but may also be applied to trend ignition of a taste, preference, behavior or action.

In exemplary implementations, a predictive algorithm predicts probabilities. These probabilities may be used to identify a subset of users to whom signals will be sent. For example, an app marketer may want to send signals recommending a swim class to a subset of users, if the predictive algorithm indicates that the subset of users is more likely to join a swim class because their friends have joined the swim club.

Figure 6A:
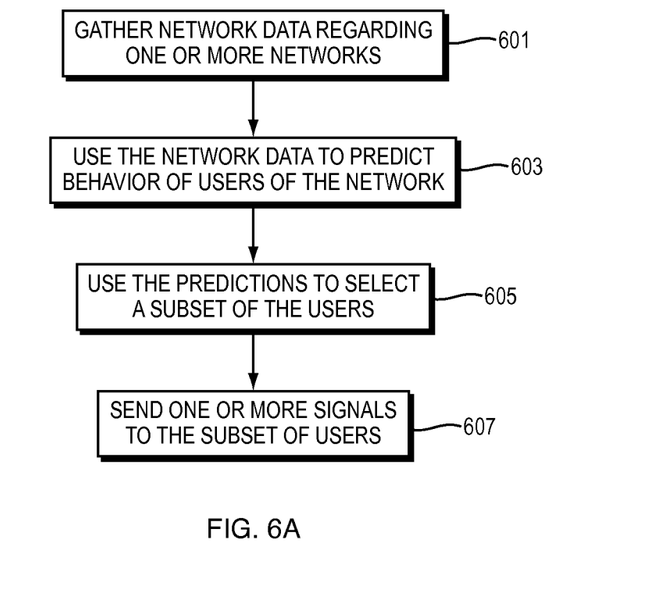
FIG. 6A and FIG. 6B each show a method in which signals are sent to a subset of users of one or more networks.
Figure 6B:
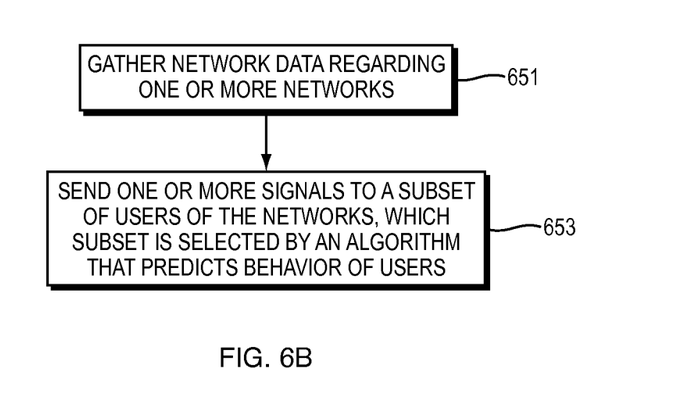

FIGS. 6A and 6B are high level flows charts showing examples of sending signals to a subset of users identified by a predictive algorithm.

In the method shown in FIG. 6A, network data regarding one or more networks is gathered 601. The network data is used to predict the behavior of users of the network 603. The predictions are used to select a subset of the users 605. One or more signals are sent to the user 607.

In the method shown in FIG. 6B, network data regarding one or more networks is gathered 651. One or more signals are sent to a subset of users of the networks, which subset is selected by an algorithm that predicts behavior of users 653.

Figure 7:
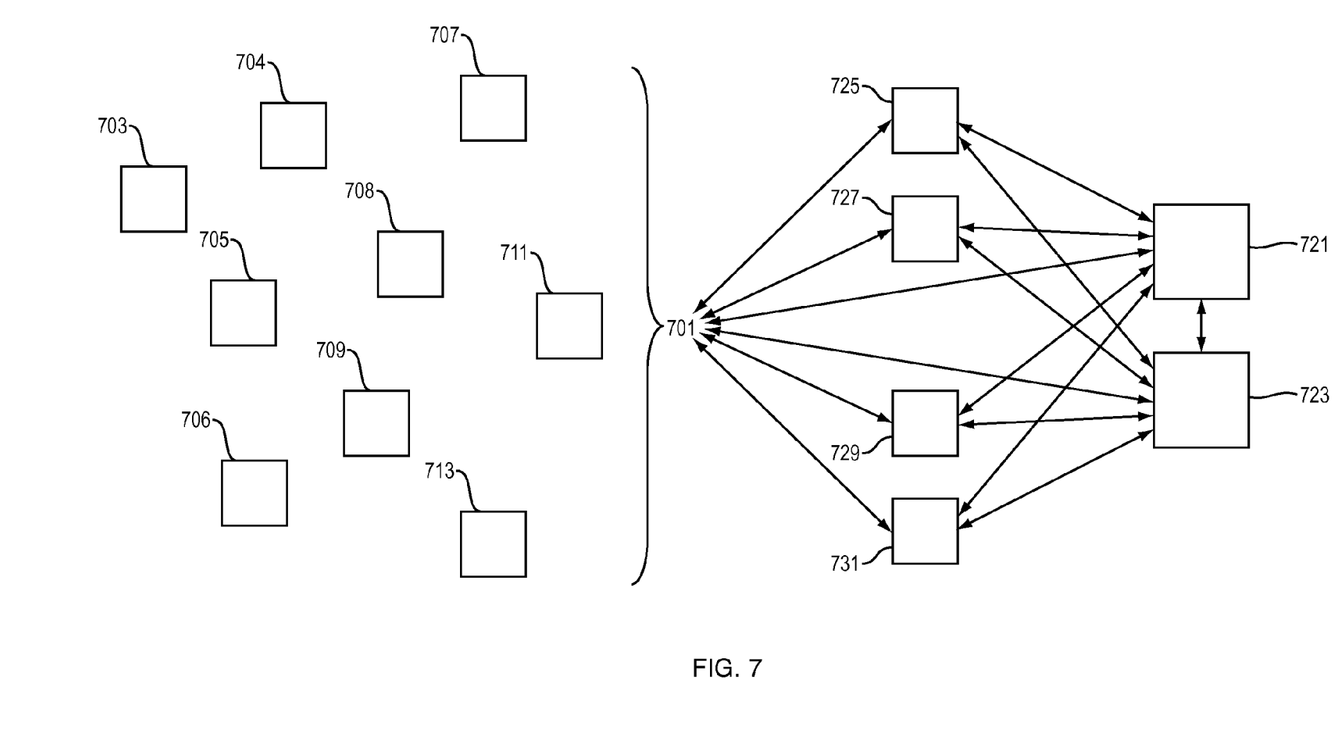
FIG. 7 is a high level block diagram of hardware.

FIG. 7 is a high level block diagram showing hardware in an illustrative implementation of this invention. A network 701 comprises node devices (e.g. 703, 704, 705, 706, 707) and other electronic components (e.g., 708, 709, 711, 713). The network gathers network data, including data regarding communications over the network. One or more computer processors (e.g., 721, 723) perform calculations, including the calculations used in Equations 1 to 12. The processors are linked to electronic components (e.g., 725, 727, 729, 731). The network data is used to predict the behavior of users of the network. Based on these predictions, signals are sent the subset of users. One or more hardware components, which may be in the network (e.g. 708, 709, 711, 713) or outside of the network (e.g. 725, 727, 729, 731), may be used to send the signals, or to send output data regarding the subset of users.

In FIG. 7, each of the node devices, electronic components and computer processors may be linked, including by a wired or wireless connection, with any one or more other devices. The one or more computer processors may be arranged in any physical or network configuration, including at a distance from each other or at a distance from the network.

This invention may be implemented as a method of sending one or more signals, which method comprises, in combination: (a) using one or more networks to gather network data, which one or more networks include node devices, and which network data includes data that is indicative of communications among at least some node devices, and (b) using electronic components to send the one or more signals to a subset of human users of the one or more networks, wherein the subset comprises human users selected using an algorithm performed by one or more processors, and the algorithm comprises (i) using the network data to calculate a plurality of graphs, (ii) using the plurality of graphs to calculate a composite graph, (iii) using the composite graph to compute conditional probabilities, each of the probabilities, respectively, comprising a probability that a human user will engage in a specific behavior, and (iv) using the conditional probabilities to select the subset of human users. Furthermore: (1) the method may further comprise the step of using the one or more processors to perform the algorithm; (2) a Type 1 Calculation may be used to calculate the composite graph; (3) a Type 5 Calculation may be used to calculate the conditional probabilities; (4) the conditional probability that the human user will engage in the specific behavior may be calculated as being dependent, at least in part, on whether other human users that correspond to adjacent nodes in a graph have engaged in the same behavior; (5) training data may be used to calculate an optimal weight to assign to each graph, respectively, in the plurality of graphs; (6) training data may be used to solve an optimization problem by maximizing the conditional probabilities; (7) a Type 6 Calculation may be used for model training; (8) the plurality of graphs may include a graph in which an edge between two nodes is weighted by a number of interactions between the two nodes; (9) the interactions may comprise phone calls; (10) the interactions may comprise messages that include text; (11) the plurality of graphs may include a graph that corrects for an exogenous parameter of the behavior; and (12) the algorithm may further comprise the step of calculating a trend ignition probability.

This invention may be implemented as a method of sending one or more signals, which method comprises, in combination: (a) using one or more networks to gather network data, which one or more networks include node devices, and which network data includes data that is indicative of communications among at least some node devices, and (b) using electronic components to send the one or more signals to a subset of human users of the one or more networks, wherein the subset comprises human users selected using an algorithm performed by one or more processors, and the algorithm comprises calculating a trend ignition probability. Furthermore: (1) the method may further comprise the step of using the one or more processors to perform the algorithm; (2) the algorithm may include a Type 11 Calculation, and (3) the algorithm may include a Type 12 Calculation.

This invention may be implemented as a method comprising, in combination, the following steps: (a) one or more computer processors: (i) using network data regarding one or more networks to calculate a plurality of graphs, (ii) using the plurality of graphs to calculate a composite graph, (iii) using the composite graph to compute conditional probabilities, each of the probabilities, respectively, comprising a probability that a human user will engage in a specific behavior, (iv) using the conditional probabilities to select a subset of human users of the one or more networks, and (v) generating output data in machine-readable form, which output data identifies human users comprising or included in the subset, and (b) one or more other electronic components sending the output data to (or for use in) a computer that is remote from the one or more computer processors. Furthermore: (1) the one or more other electronic components may include a signal processor, and the signal processor may modify a signal indicative of the output data; and (2) the one or more other electronic components may include a memory device, and sending the output data may comprise storing the output data in the memory device for delivery in any way to the computer that is remote.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method of sending one or more signals, which method comprises, in combination:
    (a) using one or more networks to gather network data, which one or more networks include node devices, and which network data includes data that is indicative of communications among at least some node devices, and
    (b) using electronic components to send the one or more signals to a subset of human users of the one or more networks,
    wherein
        (1) the subset comprises human users selected using an algorithm performed by one or more processors,
        (2) the algorithm comprises
            (i) using the network data to calculate a plurality of graphs,
            (ii) using the plurality of graphs to calculate a composite graph,
            (iii) using the composite graph to compute conditional probabilities, each of the probabilities, respectively, comprising a probability that a human user will engage in a specific behavior, and
            (iv) using the conditional probabilities to select the subset of human users; and
        (3) a Type 5 Calculation is used to calculate the conditional probabilities.

2. A method of sending one or more signals, which method comprises, in combination:
    (a) using one or more networks to gather network data, which one or more networks include node devices, and which network data includes data that is indicative of communications among at least some node devices, and
    (b) using electronic components to send the one or more signals to a subset of human users of the one or more networks,
    wherein
        (1) the subset comprises human users selected using an algorithm performed by one or more processors,
        (2) the algorithm comprises
            (i) using the network data to calculate a plurality of graphs,
            (ii) using the plurality of graphs to calculate a composite graph,
            (iii) using the composite graph to compute conditional probabilities, each of the probabilities, respectively, comprising a probability that a human user will engage in a specific behavior, and
            (iv) using the conditional probabilities to select the subset of human users; and
        (3) a Type 6 Calculation is used for model training.

3. A method of sending one or more signals, which method comprises, in combination:
- (a) using one or more networks to gather network data, which one or more networks include node devices, and which network data includes data that is indicative of communications among at least some node devices; and
- (b) using electronic components to send the one or more signals to a subset of human users of the one or more networks;

wherein
- (i) the subset comprises human users selected using an algorithm performed by one or more processors,
- (ii) the algorithm comprises calculating a trend ignition probability, and
- (iii) the algorithm includes a Type 11 Calculation.

4. A method of sending one or more signals, which method comprises, in combination:
- (a) using one or more networks to gather network data, which one or more networks include node devices, and which network data includes data that is indicative of communications among at least some node devices; and
- (b) using electronic components to send the one or more signals to a subset of human users of the one or more networks;

wherein
- (i) the subset comprises human users selected using an algorithm performed by one or more processors,
- (ii) the algorithm comprises calculating a trend ignition probability, and
- (iii) the algorithm includes a Type 12 Calculation.

\* \* \* \* \*